US010155553B2

(12) United States Patent
Akazawa et al.

(10) Patent No.: US 10,155,553 B2
(45) Date of Patent: Dec. 18, 2018

(54) CRAWLER DEVICE

(71) Applicant: Topy Kogyo Kabushiki Kaisha, Tokyo (JP)

(72) Inventors: Takuma Akazawa, Tokyo (JP); Seiji Oomura, Tokyo (JP); Shingo Tsukui, Tokyo (JP)

(73) Assignee: Topy Kogyo Kabushiki Kaisha, Tokyo (JP)

( * ) Notice: Subject to any disclaimer, the term of this patent is extended or adjusted under 35 U.S.C. 154(b) by 182 days.

(21) Appl. No.: 15/322,525

(22) PCT Filed: Jul. 14, 2015

(86) PCT No.: PCT/JP2015/070200
§ 371 (c)(1),
(2) Date: Dec. 28, 2016

(87) PCT Pub. No.: WO2016/013455
PCT Pub. Date: Jan. 28, 2016

(65) Prior Publication Data
US 2017/0129553 A1 May 11, 2017

(30) Foreign Application Priority Data

Jul. 23, 2014 (JP) .................................. 2014-149813
May 25, 2015 (WO) .................. PCT/JP2015/064899

(51) Int. Cl.
*B62D 55/08* (2006.01)
*B62D 55/12* (2006.01)
(Continued)

(52) U.S. Cl.
CPC ............. *B62D 55/08* (2013.01); *B62D 55/12* (2013.01); *B62D 55/125* (2013.01); *B62D 55/244* (2013.01); *B62D 55/253* (2013.01)

(58) Field of Classification Search
CPC .... B62D 55/08; B62D 55/244; B62D 55/125; B62D 55/12; B62D 55/253
(Continued)

(56) References Cited

U.S. PATENT DOCUMENTS

2004/0178677 A1* 9/2004 St-Pierre .............. B62D 55/244
305/165
2009/0195061 A1* 8/2009 Bellemare ............ B62D 55/244
305/157
(Continued)

FOREIGN PATENT DOCUMENTS

JP  S57-066978  4/1982
JP  H06-010087  2/1994
(Continued)

OTHER PUBLICATIONS

Supplementary Extended European Search Report dated Feb. 21, 2018 on European Patent Application No. EP15824653.
International Search Report corresponding to International Application No. PCT/JP2015/070200.

Primary Examiner — S. Joseph Morano
Assistant Examiner — Jean W Charleston
(74) Attorney, Agent, or Firm — Thomas B. Ryan, Patent Agent; Harter Secrest & Emery LLP

(57) ABSTRACT

In the present invention, a crawler belt (10) is provided with: an endless belt main body (11); a plurality of tread lugs (12) formed at the outer periphery of the belt main body (11) with spaces therebetween in the peripheral direction; and a pair of disengagement prevention sections (13) that are formed along the peripheral direction of the belt main body (11) at the inner periphery of the belt main body (11) and are separated in the width direction of the belt main body (11). The disengagement prevention sections (13) are configured from a plurality of rib segments (13a) extending in the peripheral direction and disposed along the peripheral direc-
(Continued)

tion with spaces therebetween. Each rib segment (13*a*) is disposed at a position in the peripheral direction corresponding to a tread lug (12).

10 Claims, 16 Drawing Sheets

(51) Int. Cl.
*B62D 55/253* (2006.01)
*B62D 55/125* (2006.01)
*B62D 55/24* (2006.01)

(58) Field of Classification Search
USPC ........ 305/158, 165, 166, 167, 177, 178, 179
See application file for complete search history.

(56) References Cited

U.S. PATENT DOCUMENTS

| 2009/0195062 | A1 |   | 8/2009 | Uchida |
| 2010/0148574 | A1 | * | 6/2010 | Lemaire ............ B62D 55/0842 305/158 |

FOREIGN PATENT DOCUMENTS

| JP | H07-081635 | A | 3/1995 |
| JP | 2005-271658 | A | 10/2005 |
| JP | 2005-343240 | A | 12/2005 |
| JP | 2006-062391 | A | 3/2006 |
| JP | 3985870 |   | 7/2007 |
| JP | 2012-061962 | A | 3/2012 |
| WO | 2007/086428 | A1 | 8/2007 |

* cited by examiner

CRAWLER DEVICE

FIELD OF THE INVENTION

The present invention relates to a crawler device and particularly relates to a structure for preventing disengagement of a crawler belt from a wheel.

BACKGROUND ART

A crawler device including front and rear wheels and a crawler belt wrapped around the wheels is well known in the art.

For example, in a crawler device to be put under a relatively light load such as a one used in a robot, torque may be transmitted via friction between an inner periphery of a crawler belt and an outer periphery of a wheel or may be transmitted by engagement of engagement portions formed in the outer periphery of the wheel and engagement portions formed in the crawler belt.

In such a crawler device, it is required to provide means for preventing the crawler belt from being disengaged from the wheel when the crawler belt is subjected to a force in a width direction.

In a crawler device disclosed in FIGS. 1 to 4 of Patent Document 1, plates are fixed to side plates disposed in opposite sides of a crawler belt. Disengagement of the crawler belt is prevented by the plates.

In a crawler device disclosed in FIG. 5 of Patent Document 1, a pair of endless ribs that extend inwardly in a radial direction and are continuous in a peripheral direction are respectively formed in opposite side edges of a crawler belt. Disengagement of the crawler belt is prevented by engagement of the pair of ribs with opposite side surfaces of a wheel.

A crawler device disclosed in Patent Document 2 includes features similar to those of Patent Document 1 although these features are not provided for the purpose of preventing disengagement of a crawler belt. Specifically, a pair of ribs that extend inwardly in a radial direction and are continuous in a peripheral direction are formed in opposite side edges of the crawler belt. The ribs are engageable with side plates that support a wheel.

Problem to be Solved by the Invention

When a plate having a wide area is used as means for preventing disengagement of a crawler belt as described in Japanese Unexamined Patent Application Publication No. 2002-61962, weight may be increased.

When ribs continuous in a peripheral direction are disposed in opposite side edges of a crawler belt as described in Japanese Unexamined Patent Application Publication No. 2002-61962 and Japanese Patent No. 3985870, the ribs may be deformed in a waved shape when the crawler belt is contacted with wheels. This may lead to damages due to fatigue. Moreover, the continuous ribs may enhance bending rigidity of the crawler belt, which may reduce efficiency of torque transmission.

SUMMARY OF THE INVENTION

Solution to the Problem

To solve the problems mentioned above, the present invention provides a crawler device including front and rear wheels and a crawler belt wrapped around the front and rear wheels, wherein: the crawler belt includes (a) an endless belt main body, (b) a multitude of tread lugs formed in an outer periphery of the belt main body such that the tread lugs are spaced from one another in a peripheral direction and (c) a pair of disengagement prevention sections formed in the belt main body along the peripheral direction such that the pair of disengagement prevention sections are spaced from each other in a width direction of the belt main body; and the pair of disengagement prevention sections can be protruded inward in a radial direction of the crawler belt so as to be engageable with opposite side surfaces of the wheels for preventing the crawler belt from being disengaged from the wheels, wherein each of the disengagement prevention sections includes a multitude of rib segments arranged along the peripheral direction spaced from one another, the rib segments extending in the peripheral direction; and the rib segments are disposed at positions corresponding to positions of the tread lugs in the peripheral direction.

According to the features mentioned above, the disengagement prevention sections are composed of the multitude of rib segments spacedly arranged along the peripheral direction. Since the rib segments are disposed at the positions corresponding to the positions of the tread lugs in the peripheral direction, a bending rigidity of the crawler belt can be kept low. As a result, the torque can be transmitted efficiently.

Preferably, in each of the disengagement preventions sections, the rib segments are disposed at the positions corresponding to the positions of the tread lugs in one to one correspondence; a dimension of the rig segments in the peripheral direction is equal to or smaller than a dimension of the tread lugs in the peripheral direction; and the rib segments are disposed in areas of an inner periphery of the belt main body corresponding to areas where the tread lugs are formed.

According to the features mentioned above, the bending rigidity of the crawler belt can be kept lower.

Preferably, the tread lugs extend in a width direction of the crawler belt; a dimension of the tread lugs in the width direction is equal to a width of the belt main body; and the rib segments of the pair of disengagement prevention sections are respectively disposed at positions corresponding to positions of opposite end portions of the tread lugs or at positions inside in the width direction of the crawler belt with respect to the positions of the opposite end portions of the tread lugs.

According to the features mentioned above, the dimensions of the tread lugs in the width direction of the belt can be secured to the maximum extent, and thereby, the travelling performance of the crawler device can be maintained high even in rough terrains.

Preferably, each of the wheels has a pair of belt receiving portions formed in an outer periphery thereof; the pair of belt receiving portions are spaced from each other in a width direction of the wheel; the pair of belt receiving portions are formed along a peripheral direction of the wheel such that the pair of belt receiving portions are protruded outward in a radial direction of the wheel; an inner periphery of the belt main body of the crawler belt can be frictionally contacted with top surfaces of the belt receiving portions; outer side surfaces of the pair of belt receiving portions in the width direction of the wheels are provided as the opposite side surfaces of the wheels with which the rib segments can be engaged; a multitude of first engagement protrusions are formed in an outer periphery of the wheels such that the first engagement protrusions are spaced from one another in the peripheral direction; protruded heights of the first engagement protrusions are lower than the belt receiving portions; a multitude of second engagement protrusions engageable with the first engagement protrusions are formed in the inner periphery of the belt main body of the crawler belt such that the second engagement protrusions are spaced from one another in the peripheral direction; and plays in the peripheral direction are provided between the first engagement protrusions and the second engagement protrusions.

According to the features mentioned above, when the crawler device travels under low load, the torque can be transmitted via the friction between the belt receiving portions of the wheels and the crawler belt. When the crawler device travels under high load, the torque can be transmitted via the engagement of the first engagement protrusions and the second engagement protrusions.

Preferably, the second engagement protrusions are disposed between the pair of disengagement prevention sections such that the second engagement protrusions are spaced from the disengagement prevention sections in a width direction of the crawler belt; and the belt receiving portions of the wheels are disposed at positions corresponding to areas between the second engagement protrusions and the disengagement prevention sections.

Preferably, each of the belt receiving portions is composed of a multitude of wall segments extending in the peripheral direction and disposed spaced from one another in the peripheral direction.

According to the features mentioned above, sands and mud can be smoothly eliminated from the gaps between the wall segments.

Preferably, a multitude of first engagement protrusions are formed in an outer periphery of the wheel such that the first engagement protrusions are spaced from one another in the peripheral direction; an inner periphery of the belt main body of the crawler belt can be frictionally contacted with top surfaces of the first engagement protrusions only; a multitude of second engagement protrusions engageable with the first engagement protrusions are formed in the inner periphery of the belt main body of the crawler belt such that the second engagement protrusions are spaced from one another in the peripheral direction; and plays in the peripheral direction are provided between the first engagement protrusions and the second engagement protrusions.

According to the features mentioned above, it is not required to provide belt receiving portions to be frictionally contacted with the crawler belt in opposite sides of the first engagement protrusions in the width direction of the wheel. Thereby, sands and mud can be smoothly eliminated.

More preferably, the wheel includes a wheel main body and engagement members made of rubber; the wheel main body includes receiving grooves in an outer periphery thereof, the receiving grooves spaced from one another in a peripheral direction; the engagement members are fixedly received in the receiving grooves; and portions of the engagement members protruded from the outer periphery of the wheel main body are provided as the first engagement protrusions.

In one aspect of the present invention, the crawler belt is made of an elastic material and integrally includes the belt main body, the tread lugs and the rib segments.

According to the features mentioned above, cost for manufacturing the crawler belt can be reduced. Moreover, since the rib segments are formed at the positions corresponding to the positions of the tread lugs in the peripheral direction, deformation of the rib segments can be constrained even if the rib segments are made of elastic materials. Therefore, the rib segments can be kept from being damaged for a long period of time.

In another aspect of the present invention, the crawler belt includes a main portion made of an elastic material and U-shaped members made of a rigid material; the main portion integrally includes the belt main body and the tread lugs; each of the U-shaped members includes a base portion embedded in the elastic material of the main portion and a pair of raised portions continuing from opposite ends of the base portion; and the pair of raised portions are protruded inward in the radial direction of the crawler belt from the inner periphery of the belt main body and provided as the rib segments.

According to the features mentioned above, durability of the rib segments can be enhanced since the rig segments are made of the rigid materials.

Advantageous Effects of the Invention

According to the present invention, disengagement of the crawler belt can be prevented while increase in the weight can be constrained. Moreover, bending rigidity of the crawler belt can be kept low even if the disengagement prevention sections are formed.

BRIEF DESCRIPTION OF THE DRAWING FIGURES

DESCRIPTION OF THE PREFERRED EMBODIMENTS

Figure 23:
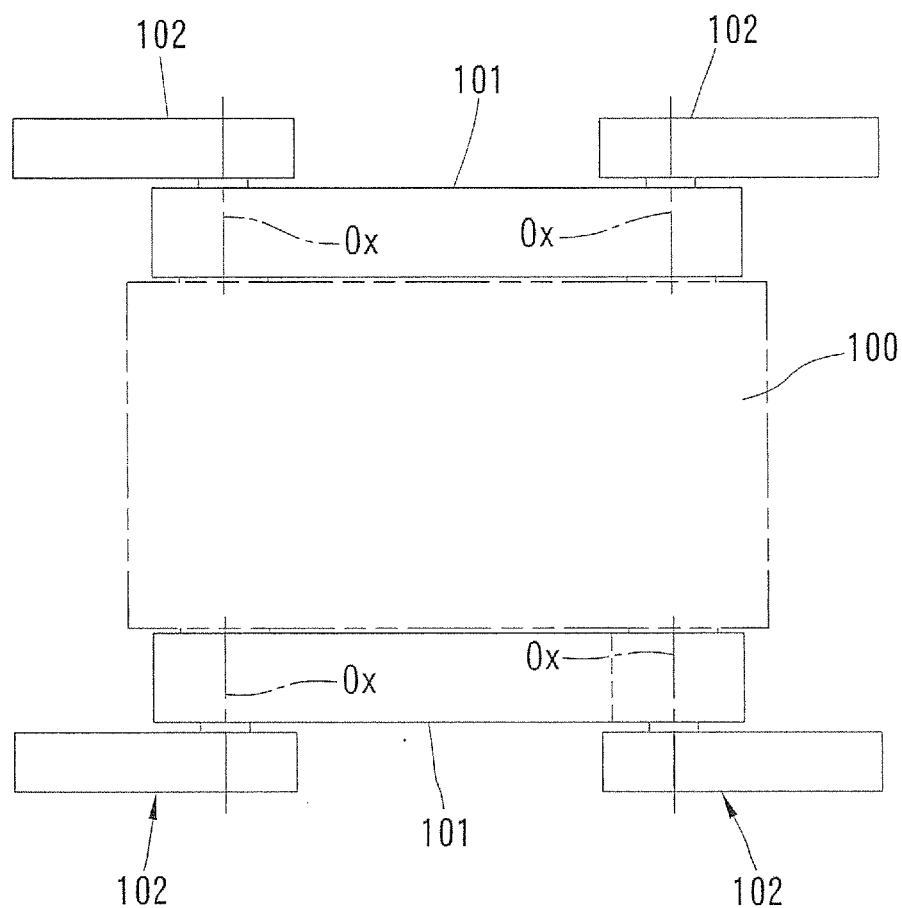
FIG. 23 is a schematic plan view of a robot in which the crawler device of the present invention is used.
Figure 24:
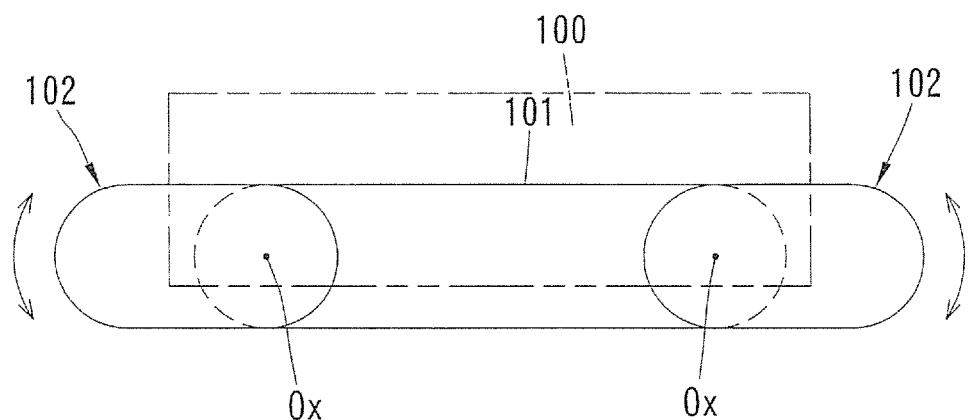
FIG. 24 is a schematic side view of the robot.

The present invention will be described hereinafter with reference to the drawings. FIGS. 23 and 24 show a robot to be remotely controlled. The robot includes a vehicle body 100, a pair of primary crawler devices 101 disposed to the left and right of the vehicle body 100 and flipper type secondary crawler devices 102 disposed to front and rear end portions of the primary crawler devices 101 so as to be rotatable about rotational axes Ox.

Observation devices such as a video camera and a work arm that can be used for various works as necessary or the like are mounted on the vehicle body 100.

In first to fifth embodiments of the present invention to be described below, the present invention is applied to the primary crawler devices 101. The present invention may be applied to the flipper type secondary crawler devices 102. Alternatively, the present invention may also be applied to a crawler device of a robot without flipper type secondary crawler devices.

A first embodiment of the present invention will be described hereinafter with reference to FIGS. 1 to 13B.

Figure 1:
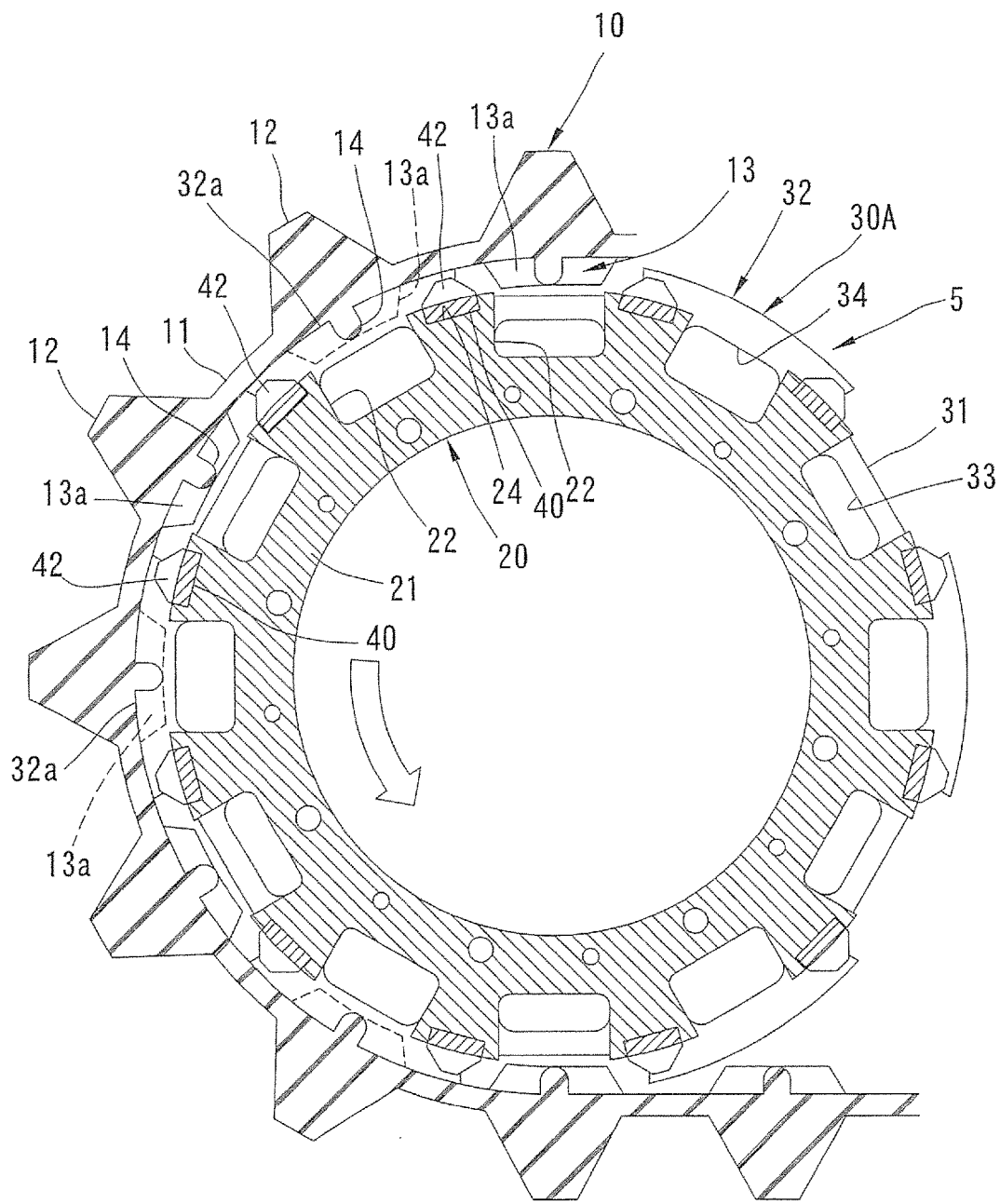
FIG. 1 is a simplified sectional side view of a major portion of a crawler device according to a first embodiment of the present invention, showing the crawler device in a normal state travelling under low load.
Figure 2:
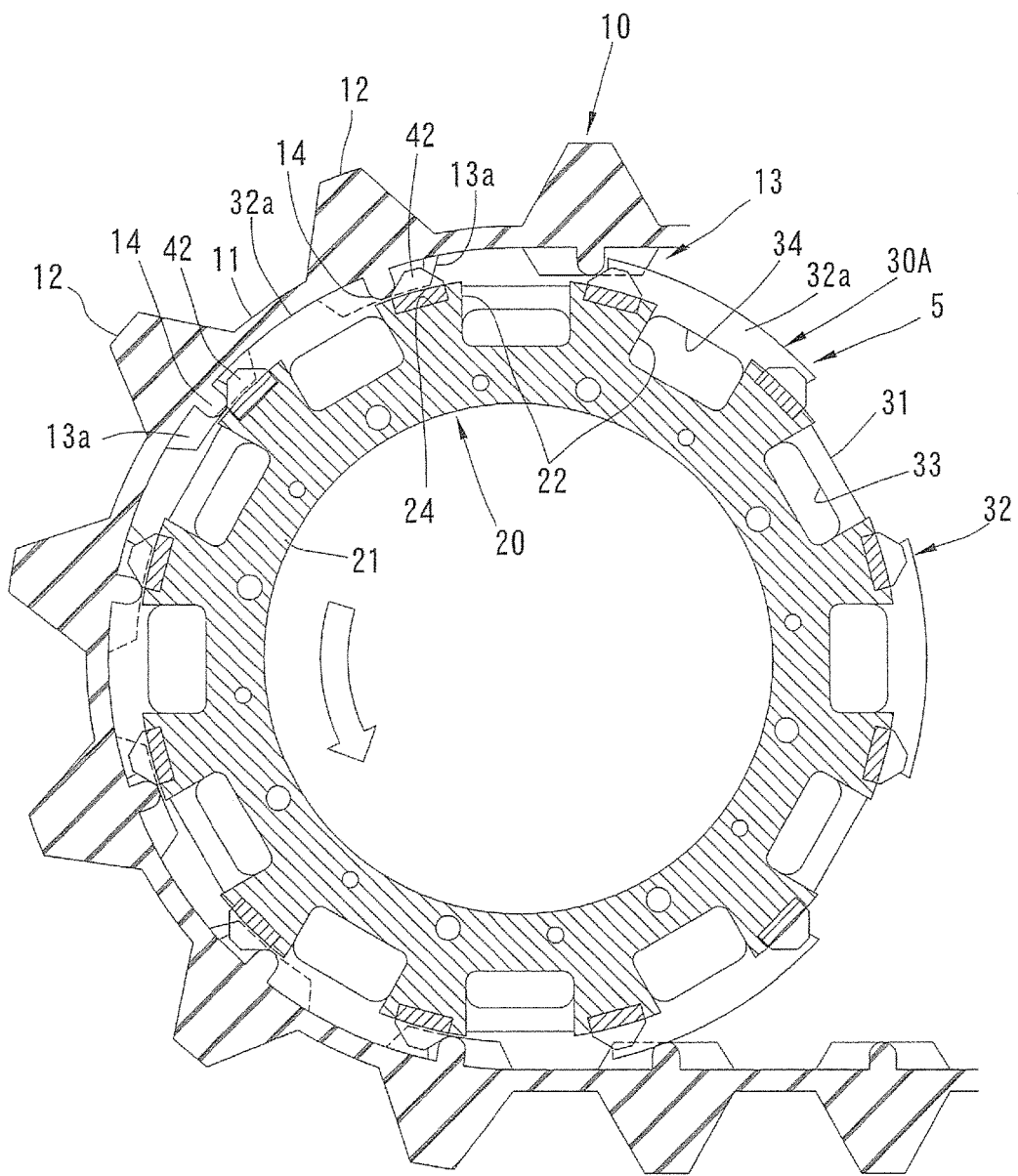
FIG. 2 is a simplified sectional side view of the major portion of the crawler device, showing the crawler device in a state travelling under high load.

As shown in FIGS. 1 and 2, a crawler device includes a drive wheel 5 and an idler wheel (not shown) spacedly disposed in front and rear and an endless crawler belt 10 wrapped around the drive wheel 5 and the idler wheel.

The drive wheel 5 and the idler wheel are respectively fixed to front and rear axles of a robot. The axles are rotatably supported by a vehicle body 100. The drive wheel 5 receives rotary torque from a drive source such as a motor via the axle.

The drive wheel 5 and the idler wheel may be rotatably supported by the axles fixed to the vehicle body 100. In this case, the drive wheel 5 receives rotary torque from a motor via a torque transmission mechanism independent of the axles.

Features of the crawler belt 10 will be described first with reference to FIGS. 1 to 5. The crawler belt 10 includes an endless belt main body 11, a multitude of tread lugs 12 formed in an outer periphery of the belt main body 11, a pair of disengagement prevention sections 13 formed in opposite side edge portions of the belt main body 11 and a multitude of engagement protrusions 14 (second engagement protrusions) formed in a middle portion of an inner periphery of the belt main body 11 in a width direction. The tread lugs 12 are evenly spaced from one another in a peripheral direction. The disengagement prevention sections 13 are arranged along the peripheral direction. The engagement protrusions 14 are evenly spaced from one another in the peripheral direction.

The crawler belt 10 is made of elastic materials such as rubber, elastic resin or the like. The crawler belt 10 integrally includes the belt main body 11, the tread lugs 12, the disengagement prevention sections 13 and the engagement protrusions 14.

Figure 3:
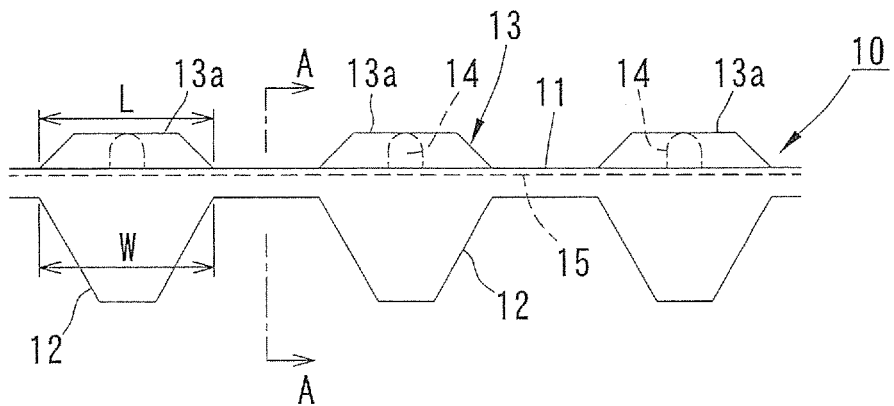
FIG. 3 is a side view of a portion of a crawler belt of the crawler device.
Figure 5:
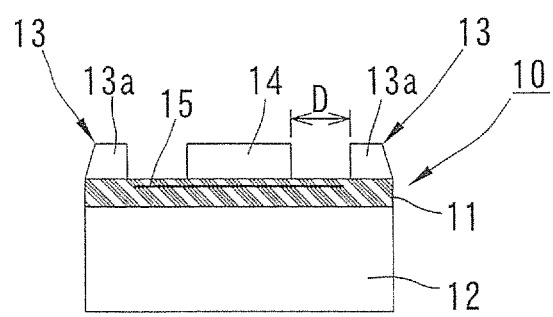
FIG. 5 is a cross-sectional view taken along line A-A of FIG. 3.

As shown in FIGS. 3 and 5, an endless high-tensile-strength belt 15 is embedded in the belt main body 11. The high-tensile-strength belt 15 is not exposed to outside because a width of the high-tensile-strength belt 15 is narrower than a width of the belt main body 11 and is disposed away from the inner periphery and the outer periphery of the belt main body 11.

The high-tensile-strength belt 15 of the first embodiment is made by welding opposite ends of a thin belt such as a steel belt having an even thickness of 0.05 to 0.3 millimeters, for example.

As shown in FIGS. 1 to 3, all of the tread lugs 12 have a same configuration with a trapezoidal cross section. As shown in FIG. 5, the tread lugs 12 extend in a width direction of the crawler belt 10. A dimension of the tread lug 12 in the width direction is equal to the width of the belt main body 11. In other words, the tread lugs 12 extend from one side edge to the other side edge of the belt main body 11.

As shown in FIGS. 1 to 4, each of the pair of the disengagement prevention sections 13 is composed of a multitude of rib segments 13a formed to be evenly spaced from one another in the peripheral direction at a same pitch as the tread lugs 12. Each of the rib segments 13a extends in the peripheral direction and is protruded from the inner periphery of the belt main body 11 inwardly in a radial direction. The rib segment 13a has a trapezoidal configuration with opposite end portions thereof in the peripheral direction inclined.

In each of the pair of disengagement prevention sections 13, the rib segments 13a are disposed at positions corresponding to positions of the tread lugs 12 in the peripheral direction. Specifically, rib segments 13a of each of the disengagement prevention sections 13 are respectively disposed in areas of the inner periphery of the belt main body 11 corresponding to areas in which the tread lug 12 are formed. More specifically, the rib segments 13a are disposed at positions corresponding to opposite ends of the tread lugs 12.

Although a dimension L of each of the rib segments 3a in the peripheral direction is equal to a dimension W of the tread lug 12 in the peripheral direction in this embodiment as shown in FIG. 3, the dimension L may be smaller than the dimension W.

Figure 4:
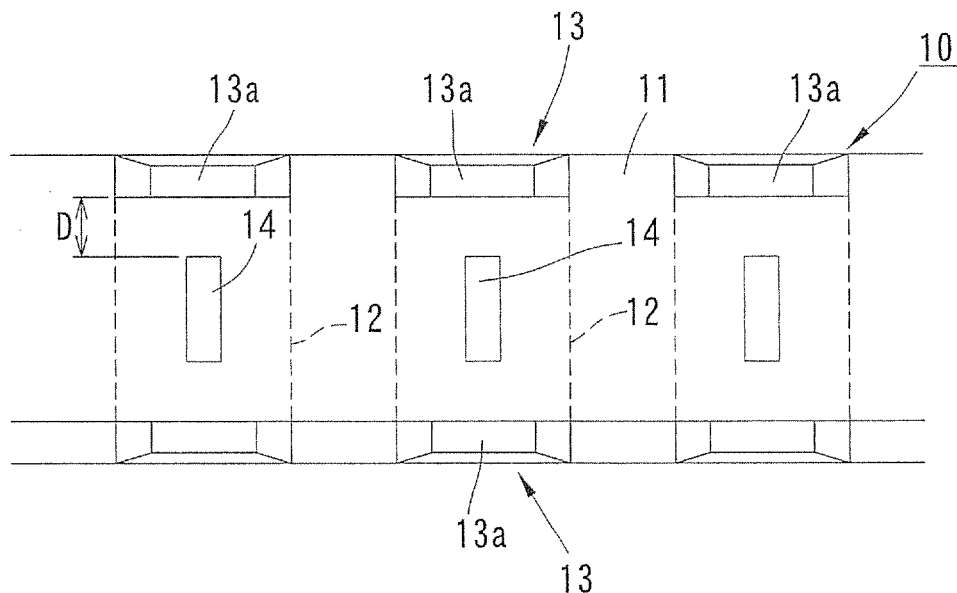
FIG. 4 is a plan view of a portion of the crawler belt.

As shown in FIGS. 4 and 5, the engagement protrusions 14 are also formed at the same pitch as the tread lugs 12. The engagement protrusions 14 extend in the width direction of the crawler belt 10 and are disposed at positions corresponding to centers of the tread lugs 12. Each of the engagement protrusions 14 is disposed between a pair of the rib segments 13a spaced from each of the rib segments 13a by a gap D. The gap D is greater than a thickness (dimension in a width direction of the wheel 5) of wall segments 32a of the wheel 5 to be described later.

Figure 6:
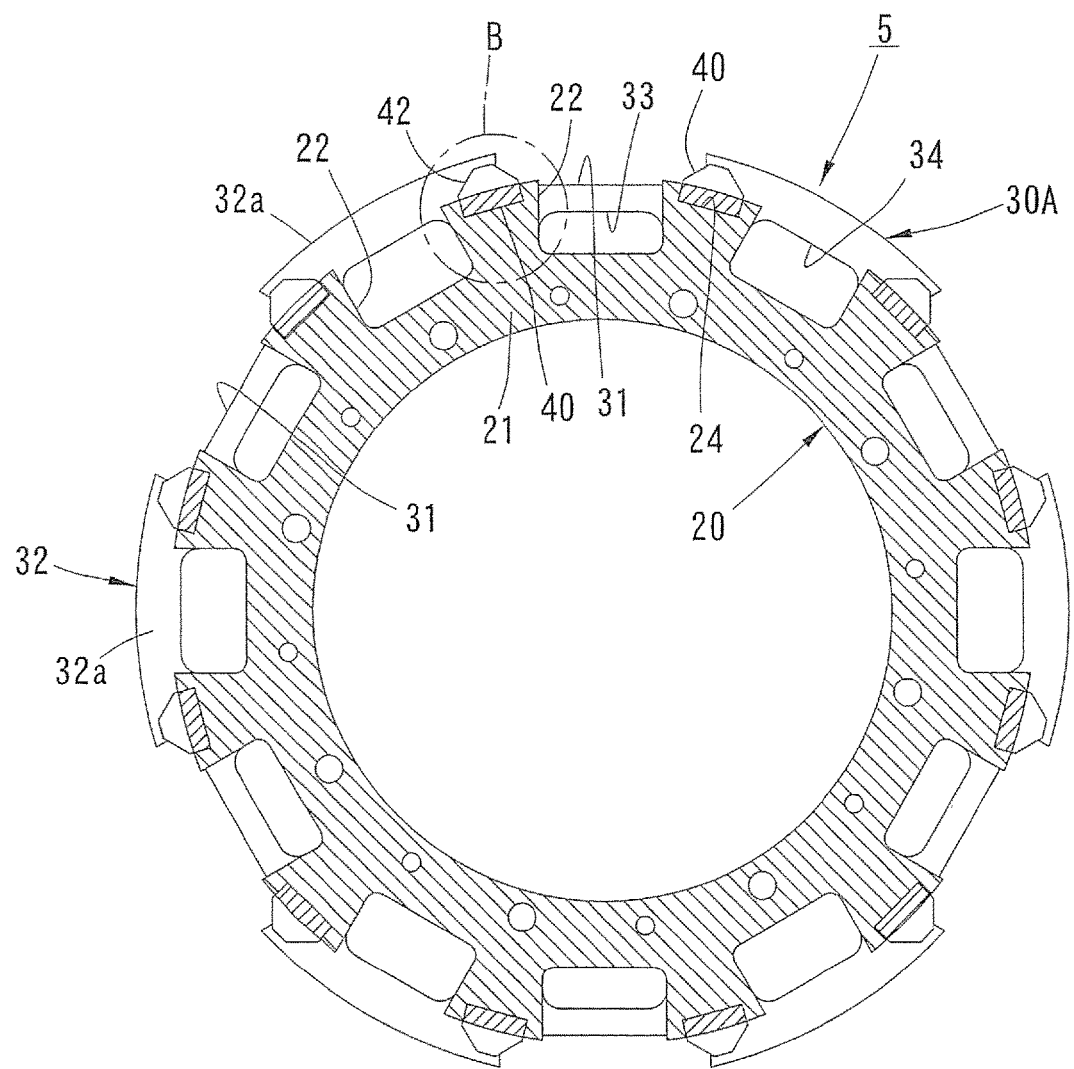
FIG. 6 is a simplified sectional side view of a wheel of the crawler device.
Figure 7:
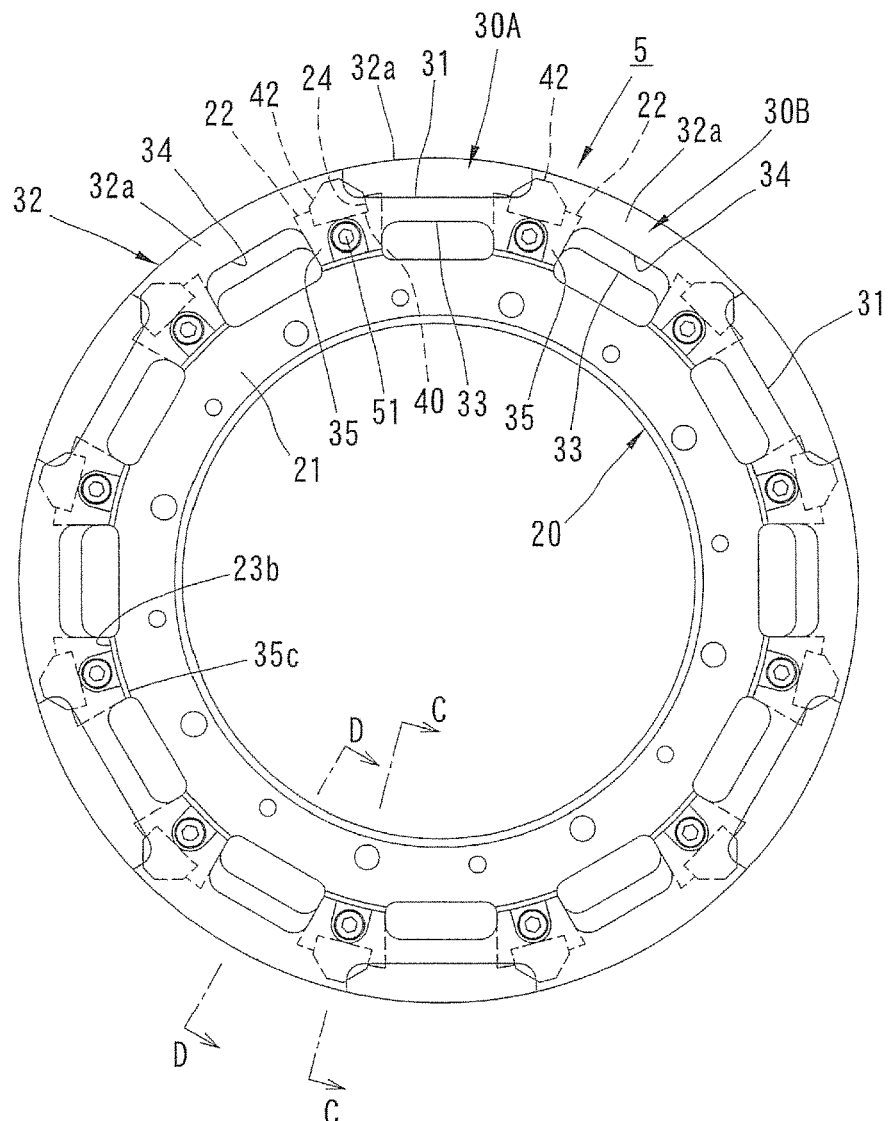
FIG. 7 is a side view of the wheel.
Figure 8:
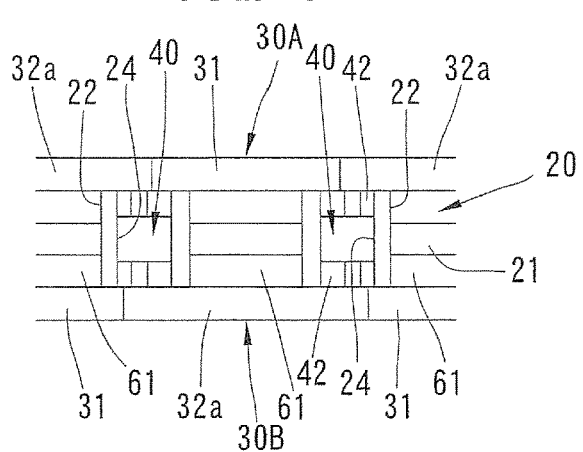
FIG. 8 is a plan view of a portion of the wheel viewed from above.

The wheel 5 will be described hereinafter with reference to FIGS. 6 to 13. As shown in FIGS. 6 to 8, the wheel 5 of this embodiment is made by assembling one base 20, two rings 30A, 30B and a multitude of engagement members 40. The base 20, the rings 30A, 30B and the engagement members 40 are made of a highly rigid resin or a light metal such as aluminum alloy. The engagement members 40 may be made of elastic materials such as rubber.

Figure 9:
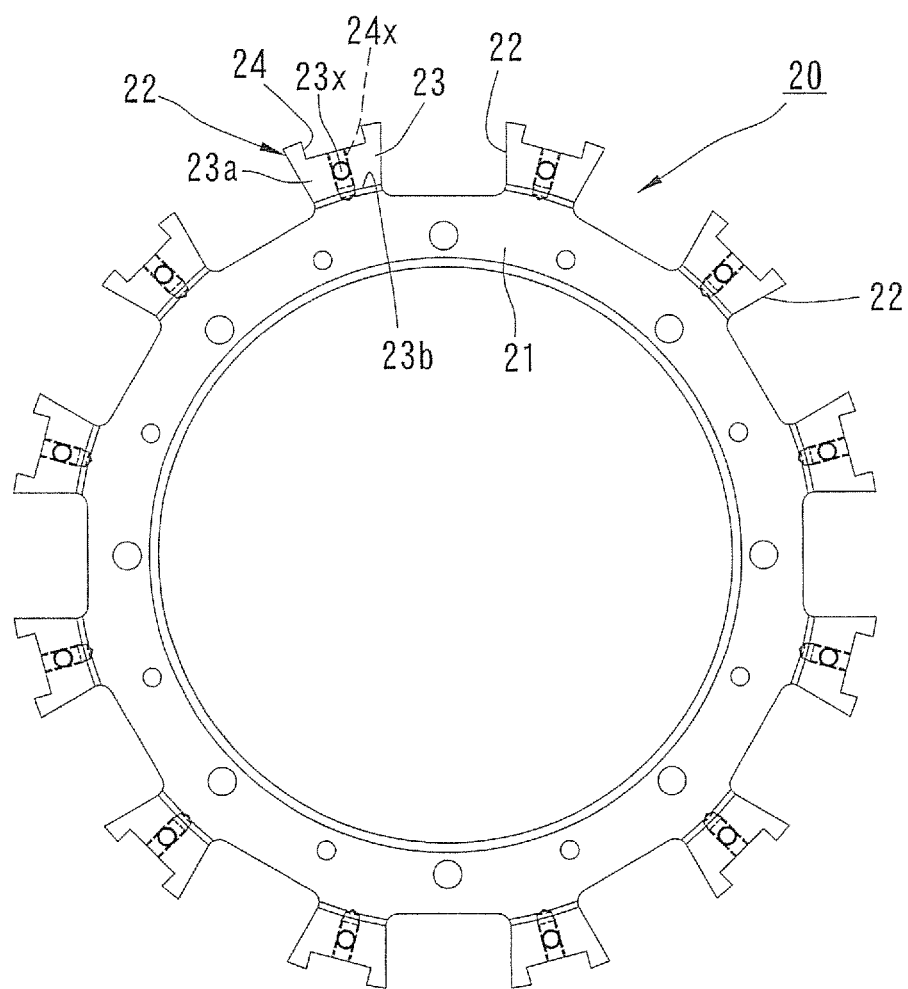
FIG. 9 is a side view of a base of the wheel.
Figure 12A:
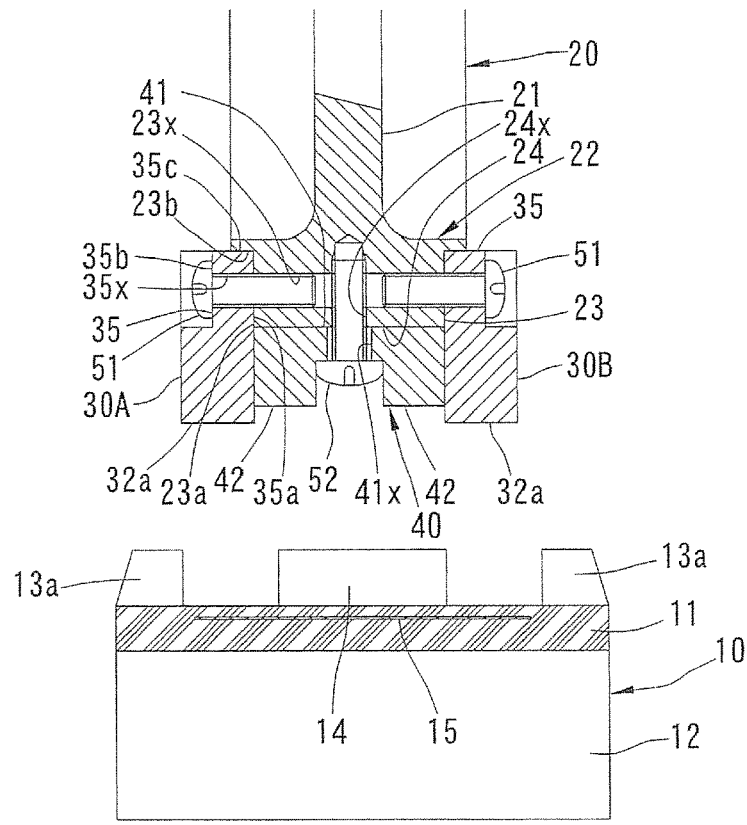
FIG. 12A is a cross-sectional view taken along line C-C of FIG. 7, showing a portion of the wheel, together with a cross-sectional view of the crawler belt separated from the wheel.
Figure 12B:
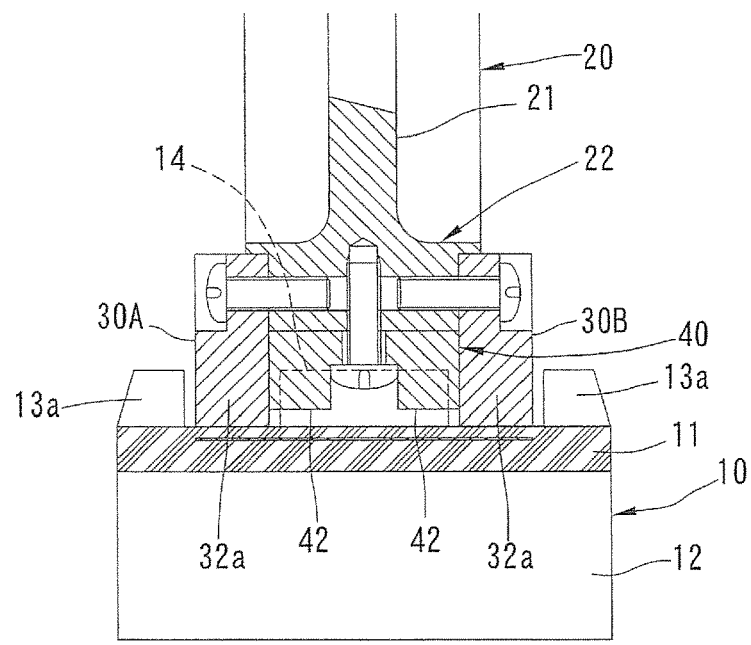
FIG. 12B is a figure corresponding to FIG. 12A, with the crawler belt wrapped around the wheel.

As shown in FIG. 9, the base 20 integrally includes a hub attachment portion 21 having a ring configuration and boss portions 22 formed in an outer periphery of the hub attachment portion 21 evenly spaced from one another. As shown in FIG. 12A, a dimension of the boss portion 22 in the width direction of the wheel 5 is greater than a dimension of the hub attachment portion 21. The boss portions 22 continue to the hub attachment portion 21 at central portions of the boss portions 22 in the width direction.

As shown in FIGS. 9 and 12A, each of the boss portions 22 includes an attachment portion 23 having a notch configuration in opposite sides of the boss portion 22 in the width direction of the wheel 5. The rings 30A, 30B can be attached to the attachment portions 23 as will be described later.

The attachment portion 23 includes a flat first receiving surface 23a orthogonal to an axis of the wheel 5 and a second receiving surface 23b having a circular arc configuration that continues to an inside edge of the first receiving surface 23a in the radial direction of the wheel 5.

A screw hole 23x extending parallel to the axis of the wheel 5 is formed in the first receiving surface 23a.

Figure 11:
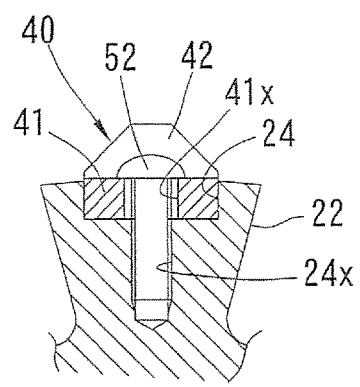
FIG. 11 is an enlarged cross-sectional view of a portion of the wheel of FIG. 6 denoted by "B", showing a detailed structure of the portion.

As shown in FIGS. 9, 11 and 12A, a shallow recess 24 (attachment portion) is formed in a top surface (surface in an outside in a radial direction) of the boss portion 22. The recess 24 has a rectangular cross-sectional configuration and extends in an axial direction of the wheel 5. The engagement member 40 is attached to the recess 24 as will be described later. A screw hole 24x extending in the radial direction is formed in a bottom surface of the recess 24.

Figure 10:
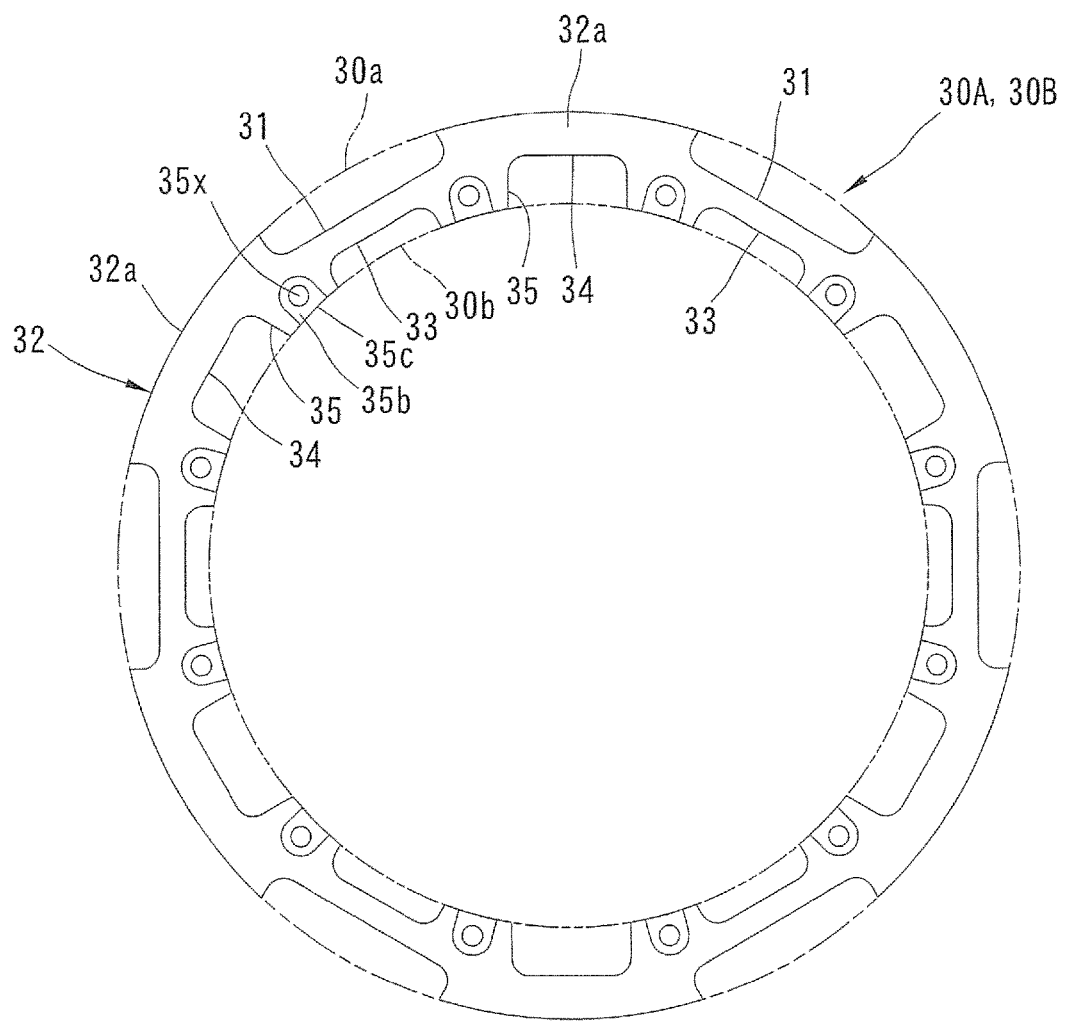
FIG. 10 is a side view of a ring of the wheel.

As shown in FIG. 10, the rings 30A, 30B have a same configuration that is circumscribed by an imaginary circumscribed circle 30a and inscribed by an imaginary inscribed circle 30b that are coaxial with the wheel 5. Shallow recesses 31 are formed in an outer periphery of each of the rings 30A, 30B evenly spaced from one another in a peripheral direction. Portions between the recesses 31 are provided as the wall segments 32a. The wall segments 32a extend in the peripheral direction and are protruded outward in a radial direction. Top surfaces of the wall segments 32a are circular arc surfaces contacted with the circumscribed circle 30a. Multitudes of the wall segments 32a constitute a belt receiving portion 32.

Shallow recesses 33 and deep recesses 34 are formed in inner peripheries of the rings 30A, 30B. The recesses 33 and the recesses 34 are arranged alternately evenly spaced from one another. The shallow recesses 33 are disposed at positions corresponding to the recesses 31 on the outer periphery and the deep recesses 34 are disposed at positions corresponding to the wall segments 32a.

A multitude of fixing portions 35 extending inwardly in the radial direction are formed between the recesses 33, 34. The fixing portions 35 are arranged along the peripheral direction evenly spaced from one another. As shown in FIGS. 10 and 12A, one side surface of each of the fixing portions 35 in the width direction of the wheel 5 is provided as a flat first abutment surface 35a and a recess 35b is formed in the other side surface. A through hole 35x is formed in a bottom surface of the recess 35b. The through hole 35x extends parallel to the axis of the wheel 5 and reaches the abutment surface 35a.

A second abutment surface 35c having a circular arc configuration is formed in each of the fixing portions 35 at a location inside in the radial direction. The second abutment surface 35c is contacted with the inscribed circle 30b.

As shown in FIG. 12A, the rings 30A, 30B are assembled onto opposite sides of the base 20 in a width direction. The fixing portions 35 of the rings 30A, 30B are fixed to the attachment portions 23 of the boss portions 22 of the base 20. Specifically, a screw 51 is threaded into the screw hole 23x of the attachment portion 23 through the through hole 35x of the fixing portion 35 in a condition where the flat first abutment surface 35a of the fixing portion 35 is surface-contacted with the flat first receiving surface 23a of the attachment portion 23 and the second abutment surface 35c of the fixing portion 35 having the circular arc configuration is surface-contacted with the second receiving surface 23b of the attachment portion 23 having the circular arc configuration.

The rings 30A, 30B are arranged in positions shifted in the peripheral direction by an angle corresponding to one pitch of the fixing portions 35. As a result, as shown in FIGS. 7 and 8, the rings 30A, 30B are arranged such that the wall segments 32a of one of the rings 30A, 30B are opposed to the recesses 31 of the other of the rings 30A, 30B. The wall segments 32a of the ring 30A and the wall segments 32a of the ring 30B are arranged alternately in the peripheral direction. Positions of the wall segments 32a of the ring 30A and the wall segments 32a of the ring 30B in the peripheral direction partially coincide with each other at the boss portions 22. In other words, when viewed from the direction of the axis of the wheel 5, end portions of the wall segments 32a of the ring 30A and the end portions of the wall segments 32a of the ring 30B partially overlap with each other.

As shown in FIGS. 11 and 12A, each of the engagement members 40 includes a base portion 41 having a rectangular configuration and a pair of engagement protrusions 42 (first engagement protrusions) having trapezoidal configurations formed in opposite end portions of the base portion 41 in the width direction of the wheel 5. A through hole 41x extending through the base portion 41 in the radial direction is formed in a central portion of the base portion 41.

The engagement member 40 is fixed to the boss portion 22 by fitting the base portion 41 of the engagement member 40 into the recess 24 formed in the boss portion 22 of the base 20 and threading a screw 52 into the screw hole 24x of the boss portion 22 through the through hole 41x of the engagement member 40. With the engagement member 40 fixed to the boss portion 22 as mentioned above, the pair of engagement protrusions 42 are disposed between the pair of rings 30A, 30B. As shown in FIG. 11, opposite end portions (opposite end portions in the peripheral direction of the wheel 5) of the engagement protrusion 42 are inclined.

Although the engagement protrusions 42 are lower than the wall segments 32a in this embodiment, the engagement protrusions 42 may be of a same height as the wall segments 32a.

As shown in FIG. 12A, the width of the belt main body 11 of the crawler belt 10 is greater than the width of the wheel 5. In other words, the width of the belt main body 11 is greater than a distance between outer side surfaces of the rings 30A, 30B.

Features of the idler wheel are the same as the features of the drive wheel 5, and therefore, detailed description of the idler wheel is omitted.

The crawler belt 10 is wrapped around the drive wheel 5 and the idler wheel having the features mentioned above.

Specifically, referring to FIGS. 1, 2, 12B and 13B, the inner periphery of the belt main body 11 of the crawler belt 10 is contacted with the top surfaces of the wall segments 32a of the pair of belt receiving portions 32 of the wheel 5. The rib segments 13a of the pair of disengagement prevention sections 13 are contacted with outer side surfaces of the wall segments 32a of the pair of belt receiving portions 32 in a width direction (opposite side surfaces of the wheel 5) or the rib segments 13a are opposed to the outer side surfaces of the wall segments 32a via slight gaps.

The engagement protrusions 14 of the crawler belt 10 are disposed at positions corresponding to areas between the engagement protrusions 42 of the wheel 5 with great plays in the peripheral direction. An example size of the play is from three to eight times a dimension of the engagement protrusions 42 in the peripheral direction.

The wall segments 32a of the wheel 5 can enter the gaps D between the rib segments 13a and the engagement protrusions 14 of the crawler belt 10.

While travelling under a normal condition (travelling under low load), as shown in FIG. 1, the rotary torque of the wheel 5 is transmitted to the crawler belt 10 via friction between the wall segments 32a and the belt main body 11 of the crawler belt 10. In this condition, it is not required that the engagement protrusions 14 of the crawler belt 10 should be in positions engaged with the engagement protrusions 42 of the wheel 5. The engagement protrusions 14 may be spaced from the engagement protrusions 42 as shown in FIG. 1.

Since the rings 30A, 30B are fixed to the wheel 5 such that the rings 30A, 30B are shifted in the peripheral direction as mentioned above, the wall segments 32a of the pair of belt receiving portions 32 are arranged alternately in the peripheral direction of the wheel 5. Therefore, the crawler belt 10 can be frictionally engaged with the wheel 5 in a continuous manner in the peripheral direction, thereby the torque can be smoothly transmitted.

While travelling under high load, slippage may occur between the crawler belt 10 and the wheel 5, and as shown in FIG. 2, the engagement protrusions 42 of the wheel 5 are abutted against the engagement protrusions 14 of the crawler belt 10. As a result, the rotary torque of the wheel 5 is transmitted to the crawler belt 10 by the engagement of the engagement protrusions 14, 42.

The rib segments 13a of the pair of disengagement prevention sections 13 are contacted with the outer side surfaces of the wall segments 32a of the pair of belt receiving portions 32 in the width direction or the rib segments 13a are opposed to the outer side surfaces of the wall segments 32a via the slight gap. Therefore, when the crawler belt 10 is subjected to a force in the width direction, the crawler belt 10 can be prevented from being disengaged by the engagement of the rib segments 13a with the wall segments 32a.

In a portion of the crawler belt 10 at which the crawler belt 10 is wrapped around the wheel 5, not all the rib segments 13a may be engageable with the wall segments 32a. For example, in a state shown in FIG. 1, every other rib segments 13a are disposed at positions corresponding to the recesses 31 of the wheel 5, not at positions corresponding to the wall segments 32a. However, other rib segments 13a adjacent to such rib segments 13a are disposed at positions corresponding to the wall segments 32a, and thereby, disengagement of the wheel 10 can be surely prevented.

In the crawler belt 10 described above 10, the rib segments 13a and the engagement protrusions 14 are not formed in areas between the tread lugs 12. Thanks to this arrangement, flexural rigidity of such areas can be low, and therefore, the torque can be efficiently transmitted between the wheel 5 and the crawler belt 10.

The rib segments 13a will not be deformed when moving past the wheel 5 since the rib segments 13a are disposed at positions corresponding to the tread lugs 12, and therefore, the rib segments 13a can be kept from being damaged due to repeated deformation.

Figure 13A:
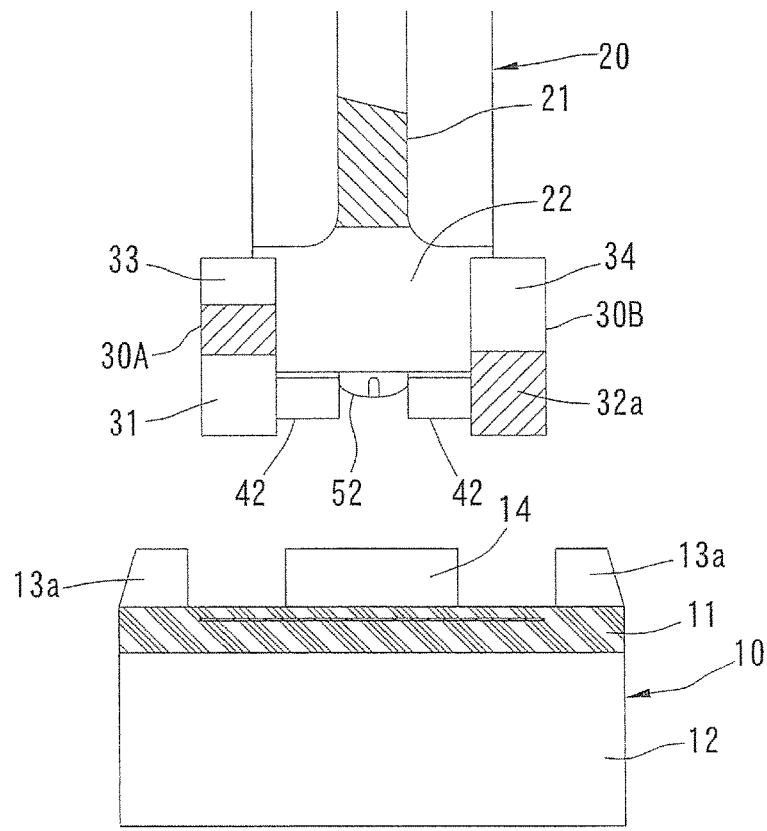
FIG. 13A is a cross-sectional view taken along line D-D of FIG. 7, showing a portion of the wheel, together with a cross-sectional view of the crawler belt separated from the wheel.
Figure 13B:
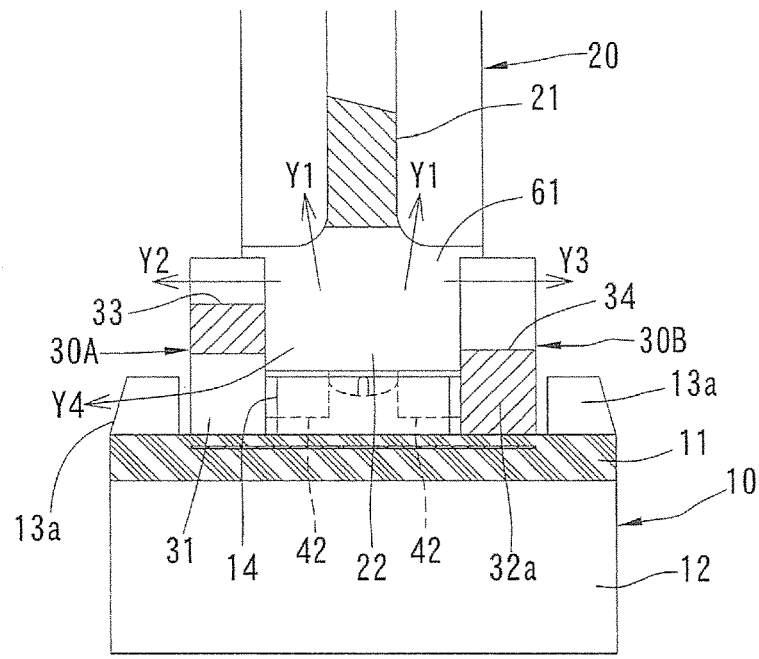
FIG. 13B is a figure corresponding to FIG. 13A, with the crawler belt wrapped around the wheel.

When the crawler device travels over rough terrains, i.e., sandy soil and muddy soil, sands and mud can be smoothly eliminated from between the wheel 5 and the crawler belt 10. In this embodiment, the following routes of elimination are provided:

(a) a route from a gap 61 (see FIGS. 8 and 13B) between adjacent boss portions 22 of the base 20 toward inside in the radial direction as indicated by arrow Y1 in FIG. 13B.

(b) a route toward outside in the width direction via the recesses 33 of the rings 30A, 30B as indicated by arrow Y2 in FIG. 13B.

(c) a route toward outside in the width direction via the recesses 34 of the rings 30A, 30B as indicated by arrow Y3 in FIG. 13B.

(d) a route toward outside in the width direction via the recesses 31 of the rings 30A, 30B as indicated by arrow Y4 in FIG. 13B. Although the rib segments 13a of the crawler belt 10 may be in positions opposed to the recesses 31, the recesses 31 will not be totally closed.

Other embodiments of the present invention will be described hereinafter with reference to the drawings. In the description of these embodiments, same reference numerals will be used to indicate features corresponding to those of foregoing embodiments, and explanation thereof will be omitted.

Figure 14:
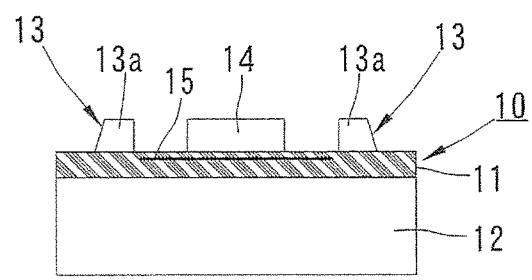
FIG. 14 is a figure corresponding to FIG. 5, showing a crawler belt used in a crawler device according to a second embodiment of the present invention.

In a second embodiment shown in FIG. 14, a belt main body 11 and tread lugs 12 are wider than those of the first embodiment. Therefore, disengagement prevention sections 13 are disposed inside with respect to opposite end portions of the tread lugs 12. Other features are similar to those of the first embodiment, and therefore, description thereof will be omitted.

A third embodiment of the present invention will be described hereinafter with reference to FIGS. 15 to 18. Features of a wheel 70 of this embodiment are different from those of the wheel 5 of the first embodiment. The wheel 70 is made of a single component integrally including a hub attachment portion 71, a base portion 72 having a wide annular configuration that continues to an outer periphery of the hub attachment portion 71 and a pair of belt receiving portions 73 disposed in an outer periphery of the base portion 72 spaced from each other in a width direction. Each of the belt receiving portions 73 is composed of a multitude of wall segments 73a evenly spaced from one another in a peripheral direction.

Moreover, engagement protrusions 74 (first engagement protrusions) are formed in a middle portion of the outer periphery of the base portion 72 in the width direction evenly spaced from one another in the peripheral direction. The engagement protrusions 74 are spaced from the wall segments 73a in the peripheral direction and are disposed between the wall segments 73a adjacent to each other in the peripheral direction. In this embodiment, the engagement protrusions 74 are disposed at central portions between the wall segments 73a.

The engagement protrusions 74 extend in the width direction of the wheel 70. A dimension of the engagement protrusion 74 in the width direction is generally equal to a gap between the wall segments 73a of the pair of belt receiving portions 73 in the width direction. The engagement protrusions 74 are lower than the wall segments 73a.

Figure 15:
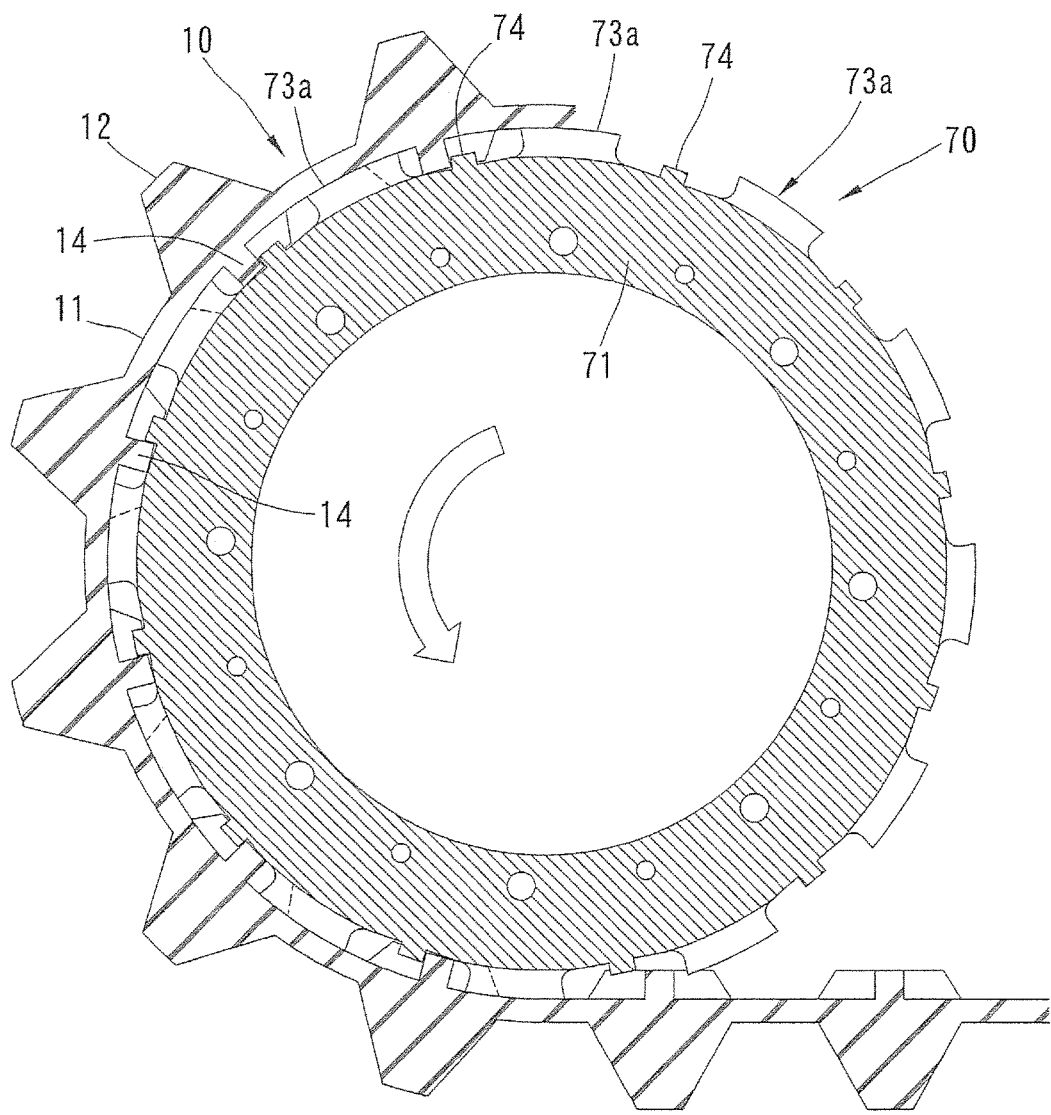
FIG. 15 is a figure corresponding to FIG. 2, showing a crawler device according to a third embodiment of the present invention.
Figure 16:
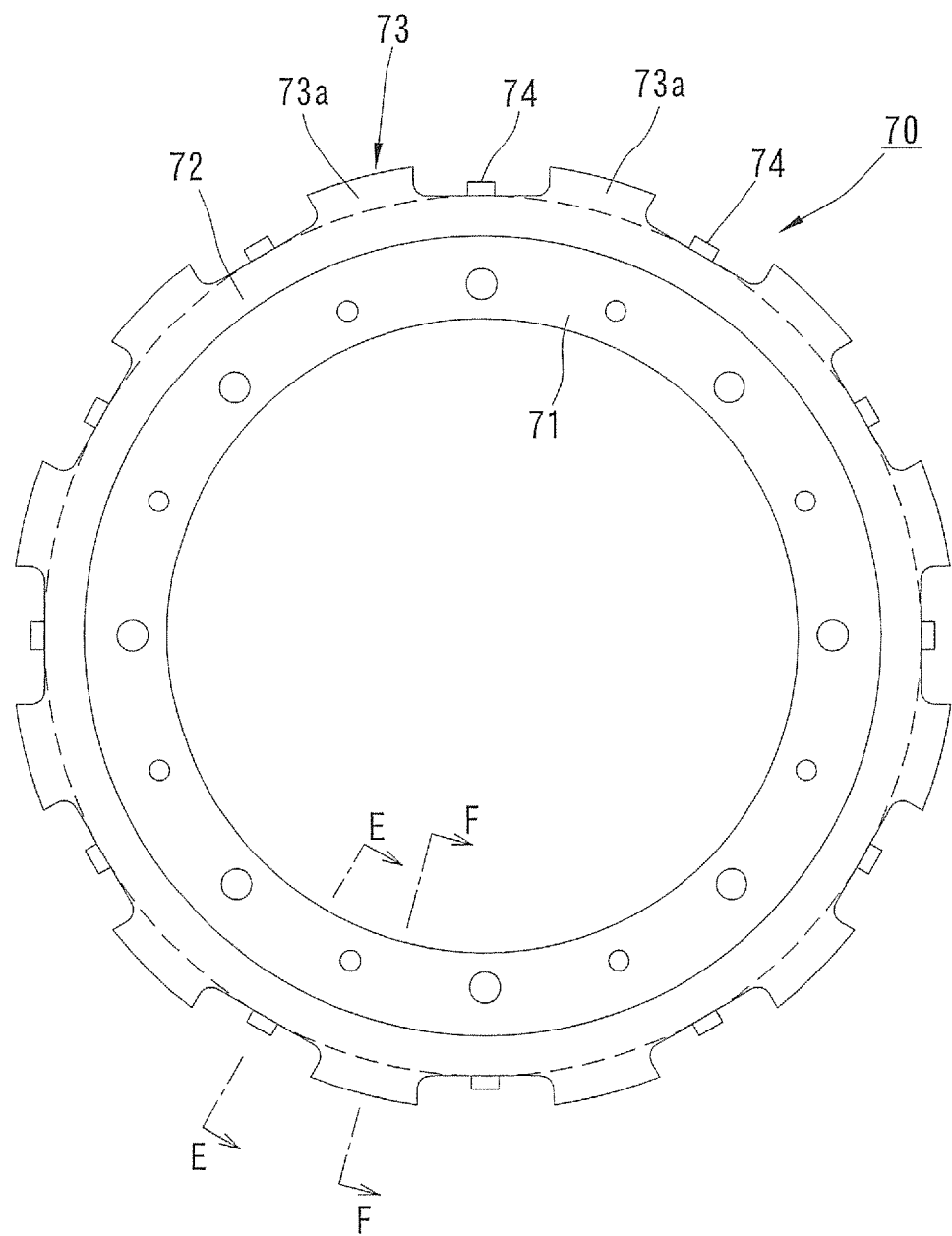
FIG. 16 is a side view of a wheel used in the crawler device according to the third embodiment.
Figure 17:
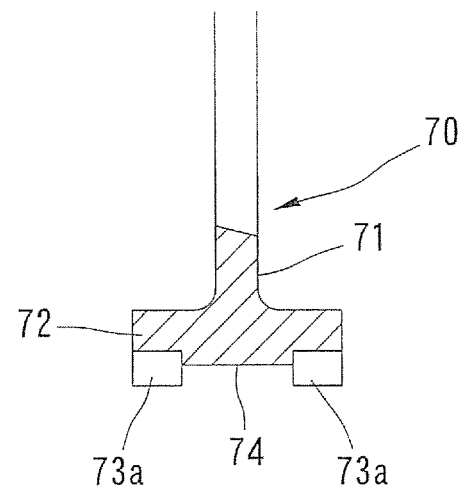
FIG. 17 is a cross-sectional view taken along line E-E of FIG. 16.
Figure 18:
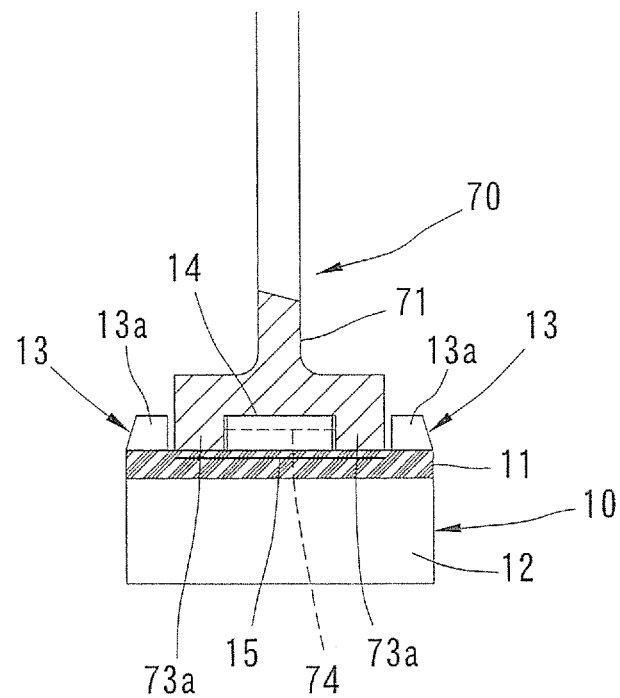
FIG. 18 is a cross-sectional view taken along line F-F of FIG. 16, with a crawler belt wrapped around the wheel.

As shown in FIGS. 15 and 18, in a state in which a crawler belt 10 is wrapped around the wheel 70, an inner periphery of a belt main body 11 of the crawler belt 10 is contacted with top surfaces of the wall segments 73a of the pair of belt receiving portions 73 of the wheel 70 and rib segments 13a of a pair of disengagement prevention sections 13 are contacted with outer side surfaces of the wall segments 73a of the pair of belt receiving portions 73 in the width direction or the rig segments 13a are opposed to the outer side surfaces of the wall segments 73a with slight gaps therebetween, thereby preventing the crawler belt 10 from being disengaged.

As with the first embodiment, engagement protrusions 14 of the crawler belt 10 are disposed at positions corresponding to areas between the engagement protrusions 74 of the wheel 70 with great plays. Mechanisms of torque transmission are similar to those of the first embodiment, and therefore, description thereof will be omitted.

In this embodiment, even if sands and mud enter between the wheel 70 and the crawler belt 10, the sands and mud will not affect the engagement between the engagement protrusions 14 and the engagement protrusions 74 since great plays are provided therebetween. Sands and mud that may enter between the wheel 70 and the crawler belt 10 can be smoothly eliminated through the gaps between the wall segments 73a in the peripheral direction and gaps between the rib segments 13a of the belt main body 11 in the peripheral direction.

Figure 19:
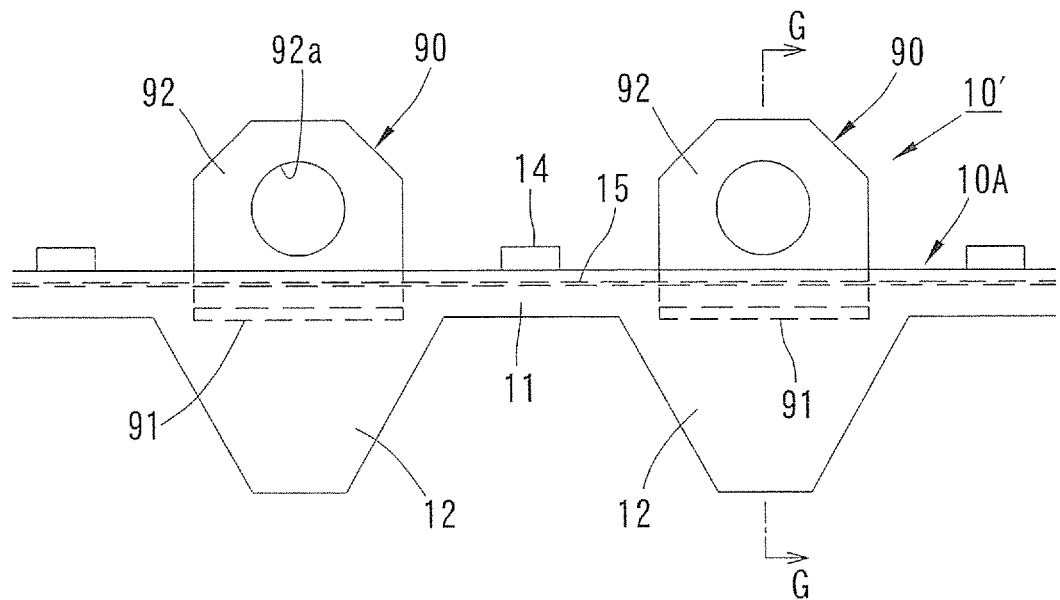
FIG. 19 is a side view of a major portion of a crawler belt of a crawler device according to a fourth embodiment of the present invention.
Figure 20:
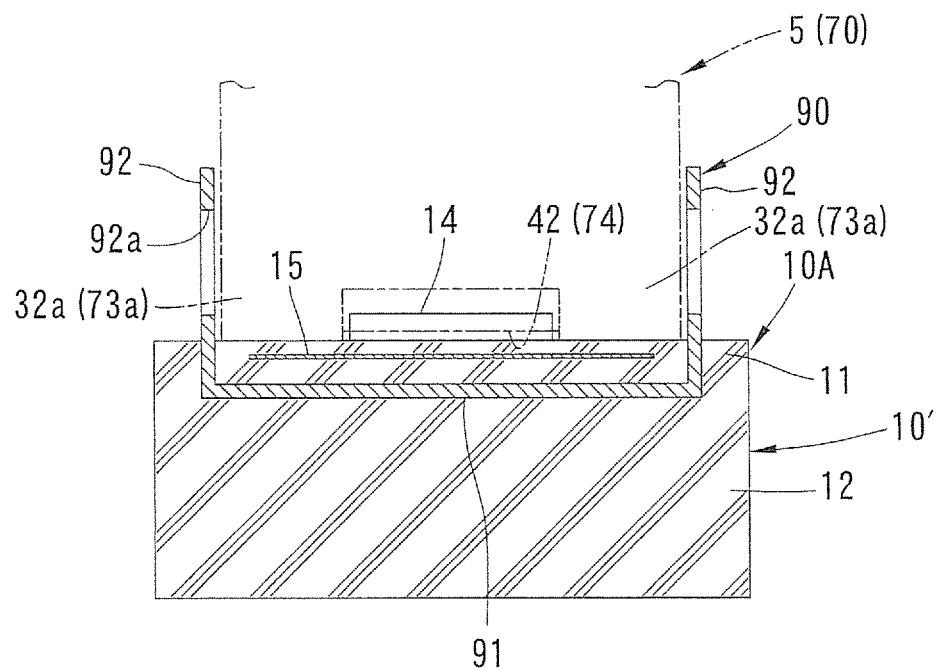
FIG. 20 is a cross-sectional view taken along line G-G of FIG. 19.

Fourth embodiment of the present invention will be described hereinafter with reference to FIGS. 19 and 20. In this embodiment, a crawler belt 10' includes a main portion 10A and generally U-shaped members 90 made of plates of a rigid material such as steel. The main portion 10A is made of an elastic material such as rubber. The main portion 10A integrally includes a belt main body 11, tread lugs 12 and engagement protrusions 14.

Each of the U-shaped members 90 includes a base portion 91 having a flat plate configuration and a pair of raised portions 92 having a flat plate configuration that continues to opposite ends of the base portion 91. The raised portions 92 are disposed at a right angle from the base portion 91. The pair of raised portions 92 are provided as rib segments of disengagement prevention sections.

The U-shaped members 90 are disposed at positions corresponding to positions of the tread lugs 12 in the peripheral direction. Specifically, the base portions 91 of the U-shaped members 90 are embedded in the main portion 10A. The pairs of raised portions 92 are protruded inward in a radial direction (opposite to a direction in which the tread lugs 12 are protruded) from areas of an inner periphery of the belt main body 11 corresponding to areas where the tread lugs 12 are formed. Each pair of the raised portions 92 extend parallel to each other and are opposed to each other in a width direction of the crawler belt 10'. Holes 92a are formed in the raised portions 92 to reduce weight.

In this embodiment, the engagement protrusions 14 are formed between the tread lugs 12, spaced from the areas where the tread lugs 12 are formed.

In a state in which the crawler belt 10' of the fourth embodiment is wrapped around a wheel 5 (70), wall segments 32a (73a) of pairs of belt receiving portions 32 (73) of the wheel 5 (70) are disposed outside in the width direction of the crawler belt 10' with respect to the engagement protrusions 14 and inside the raised portions 92 of the U-shaped members 90. The crawler belt 10' is prevented from being disengaged by the raised portions 92 being stopped by the wall segments 32a (73a).

Engagement protrusions 42 (74) of the wheel 5 (70) and the engagement protrusions 14 of the crawler belt 10' may be engaged in a similar manner as in the first embodiment and the third embodiment.

Since the U-shaped members 90 are made of a highly rigid material such as metal, not rubber, as mentioned above, durability can be enhanced.

Mechanisms for eliminating sands and mud in this embodiment are similar to those of the third embodiment.

Figure 21:
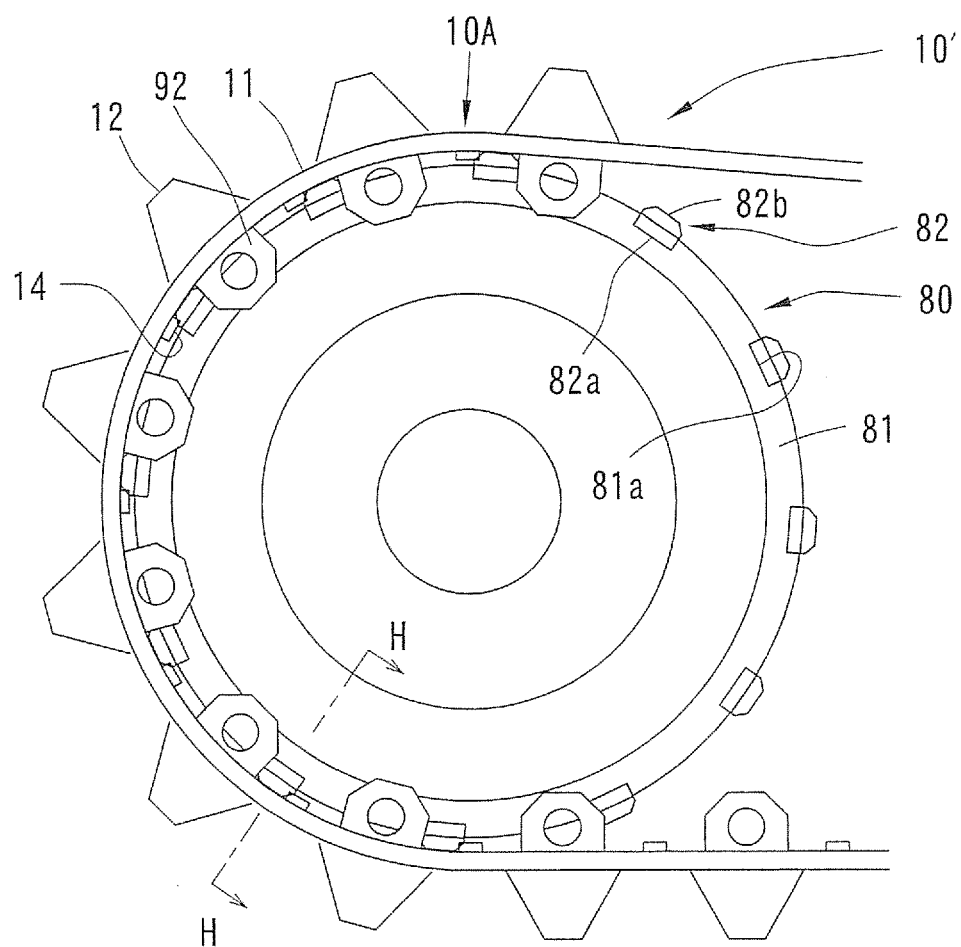
FIG. 21 is a side view of a major portion of a crawler device according to a fifth embodiment of the present invention.
Figure 22:
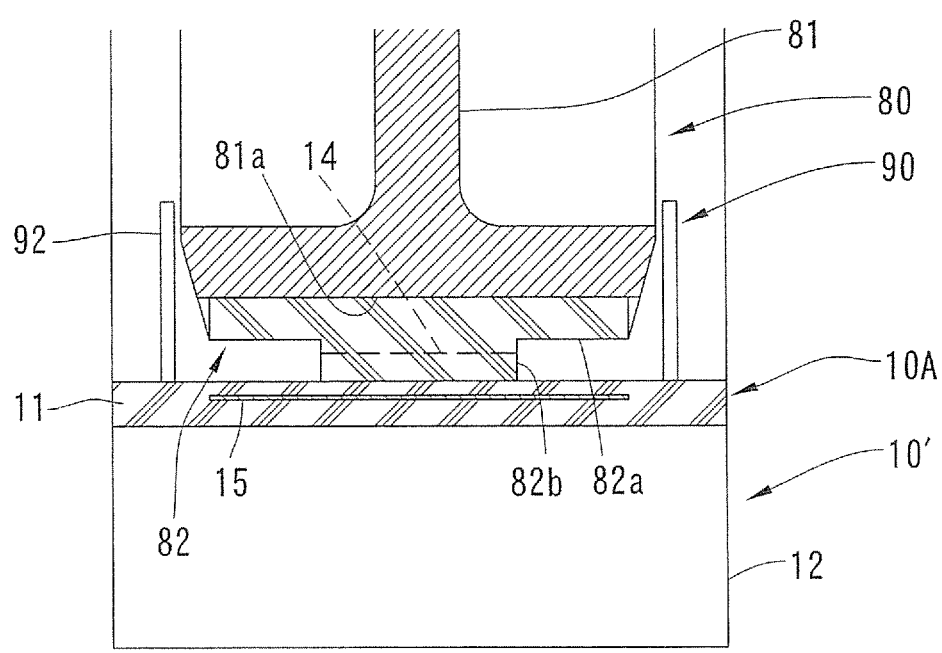
FIG. 22 is a cross-sectional view taken along line H-H of FIG. 21.

A fifth embodiment of the present invention will be described hereinafter with reference to FIGS. 21 and 22. In this embodiment, a crawler belt 10' having similar features to that of the fourth embodiment is used. A wheel 80 includes a wheel main body 81 and a multitude of engagement members 82 made of rubber. The wheel main body 81 is made of a single rigid component or an assembly of a plurality of rigid components. Receiving grooves 81a extending in a width direction of the wheel main body 81 are formed in an outer periphery of the wheel main body 81 evenly spaced from each other in a peripheral direction. The engagement members 82 integrally includes base portions 82a respectively received in the receiving grooves 81a of the wheel main body 81 and fixed with adhesive or a screw and engagement protrusions 82b respectively protruded from the base portions 82a outward in a radial direction of the wheel 80. Opposite sides of the engagement protrusions 82b in a peripheral direction are inclined.

In a state in which the crawler belt 10' is wrapped around the wheel 80, an inner peripheral surface of a belt main body 11 of the crawler belt 10' is contacted with top surfaces of the engagement protrusions 82b, and low torque may be transmitted by friction between the inner peripheral surface of the belt main body 11 and the top surfaces of the engagement protrusions 82b. The engagement protrusions 82b perform the same function as the wall segments of the belt receiving portions of the foregoing embodiments. High torque may be transmitted by engagement between engagement protrusions 14 of the crawler belt 10' and the engagement protrusions 82b of the wheel 80.

Pairs of raised portions 92 of U-shaped members 90 of the crawler belt 10' are contacted with opposite sides of a peripheral edge portion of the wheel main body 81 in the width direction or the raised portions 92 are opposed to the opposite sides of the peripheral edge portion of the wheel main body 81 with slight gaps therebetween. By this arrangement, the crawler belt 10' can be prevented from being disengaged.

In this embodiment, even if sands and mud enter between the wheel 80 and the crawler belt 10', such sands and mud will not affect the engagement between the engagement protrusions 14, 82b since great plays are provided between the engagement protrusions 14, 82b.

Since wall segments that are provided in other embodiments on outer sides of the engagement protrusions 14, 82b in the width direction of the wheel are not provided in this embodiment, sands and mud that may enter between the wheel 80 and the crawler belt 10' can be more smoothly eliminated.

The present invention is not limited to the embodiments described above, and various modifications can be adopted. For example, thin auxiliary tread lugs may be formed between the tread lugs 12 in the outer periphery of the crawler belt.

The belt receiving portions of the wheel may be formed in an annular configuration that is continuous all around the periphery.

A wheel in the rear may be a drive wheel and a wheel in the front may be an idler wheel. Alternatively, wheels in the front and the rear may be drive wheels.

Although it is preferable that the tread lugs, the rib segments, the first engagement protrusions and the second engagement protrusions may be disposed respectively evenly spaced from one another in the peripheral direction, it is not required that the pitch should be constant.

It is not required that the pitch of the first engagement protrusions and the pitch of the second engagement protrusions should coincide with each other. Engagement of some of the first engagement protrusions and some of the second engagement protrusions may be sufficient for the high torque transmission.

INDUSTRIAL APPLICABILITY

The present invention may be applied to a crawler device that may be used in a travelling body having a relatively light load such as a robot.

The invention claimed is:

1. A crawler device comprising:
front and rear wheels; and
a crawler belt wrapped around the front and rear wheels; wherein:
the crawler belt comprises:
  (a) an endless belt main body;
  (b) a multitude of tread lugs formed in an outer periphery of the belt main body such that the tread lugs are spaced from one another in a peripheral direction; and
  (c) a pair of disengagement prevention sections formed in the belt main body along the peripheral direction such that the pair of disengagement prevention sections are spaced from each other in a width direction of the belt main body; and
the pair of disengagement prevention sections are arranged to be protruded inward in a radial direction of the crawler belt so as to be engageable with opposite side surfaces of the wheels for preventing the crawler belt from being disengaged from the wheels, wherein:
  each of the disengagement prevention sections comprises a multitude of rib segments arranged along the peripheral direction spaced from one another, the rib segments extending in the peripheral direction;
  the rib segments are disposed at positions corresponding to positions of the tread lugs in the peripheral direction;
  a multitude of first engagement protrusions are formed in an outer periphery of the wheels such that the first engagement protrusions are spaced from one another in the peripheral direction;
  a multitude of second engagement protrusions engageable with the first engagement protrusions are formed in the inner periphery of the belt main body of the crawler belt such that the second engagement protrusions are spaced from one another in the peripheral direction; and
  plays in the peripheral direction are provided between the first engagement protrusions and the second engagement protrusions.

2. The crawler device according to claim 1, wherein:
in each of the disengagement preventions sections, the rib segments are disposed at the positions corresponding to the positions of the tread lugs in one to one correspondence;
a dimension of the rig segments in the peripheral direction is equal to or smaller than a dimension of the tread lugs in the peripheral direction; and
the rib segments are disposed in areas of the inner periphery of the belt main body corresponding to areas where the tread lugs are formed.

3. The crawler device according to claim 2, wherein:
the tread lugs extend in a width direction of the crawler belt;
a dimension of the tread lugs in the width direction is equal to a width of the belt main body; and
the rib segments of the pair of disengagement prevention sections are respectively disposed at at least one of (a) positions corresponding to positions of opposite end portions of the tread lugs and (b) positions inside in the width direction of the crawler belt with respect to the positions of the opposite end portions of the tread lugs.

4. The crawler device according to claim 1, wherein:
the wheels has a pair of belt receiving portions formed in an outer periphery thereof;
the pair of belt receiving portions are spaced from each other in a width direction of the wheel;
the pair of belt receiving portions are formed along a peripheral direction of the wheel;
outer side surfaces of the pair of belt receiving portions in the width direction of the wheels are provided as the opposite side surfaces of the wheels with which the rib segments are arranged to be engaged;
the second engagement protrusions are disposed between the pair of disengagement prevention sections such that the second engagement protrusions are spaced from the disengagement prevention sections in a width direction of the crawler belt;
the belt receiving portions of the wheels are disposed at positions corresponding to areas between the second engagement protrusions and the disengagement prevention sections;
each of the belt receiving portions is composed of a multitude of wall segments disposed spaced from one another in the peripheral direction;
the wall segments extend in the peripheral direction and are protruded outward in a radial direction of the wheel; and
the inner periphery of the belt main body of the crawler belt is arranged to be frictionally contacted with top surfaces of the belt receiving portions.

5. The crawler device according to claim 1, wherein:
the inner periphery of the belt main body of the crawler belt is arranged to be frictionally contacted with top surfaces of the first engagement protrusions only.

6. The crawler device according to claim 5, wherein:
the wheel comprises a rigid wheel main body and engagement members made of rubber;
the wheel main body comprises receiving grooves in an outer periphery thereof, the receiving grooves spaced from one another in a peripheral direction;
the engagement members are fixedly received in the receiving grooves; and
portions of the engagement members protruded from the outer periphery of the wheel main body are provided as the first engagement protrusions.

7. The crawler device according to claim 5, wherein: the first engagement protrusions and the second engagement protrusions are disposed between the pair of disengagement prevention sections such that the first engagement protrusions and the second engagement protrusions are spaced from the disengagement prevention sections in a width direction of the crawler belt.

8. The crawler device according to claim 1, wherein the crawler belt is made of an elastic material and integrally comprises the belt main body, the tread lugs and the rib segments.

9. The crawler device according to claim 1, wherein:
- the crawler belt comprises a main portion made of an elastic material and U-shaped members made of a rigid plate material;
- the main portion integrally comprises the belt main body and the tread lugs;
- each of the U-shaped members comprises a base portion embedded in the elastic material of the main portion and a pair of raised portions continuing from opposite ends of the base portion; and
- the pair of raised portions are protruded inward in the radial direction of the crawler belt and provided as the rib segments.

10. The crawler device according to claim 1, wherein the plays in the peripheral direction between the first engagement protrusions and the second engagement protrusions are of a size from three to eight times dimensions of the first engagement protrusions in the peripheral direction.

* * * * *